(12) United States Patent
Merabet et al.

(10) Patent No.: US 7,726,524 B2
(45) Date of Patent: Jun. 1, 2010

(54) MAGNETICALLY-COUPLED VALVE

(75) Inventors: Djamel Merabet, Eybens (FR); Eric Prus, Grenoble (FR); Patrick Ballu, Reims (FR)

(73) Assignee: Sames Technologies, Meylan (FR)

( * ) Notice: Subject to any disclaimer, the term of this patent is extended or adjusted under 35 U.S.C. 154(b) by 977 days.

(21) Appl. No.: 10/551,283

(22) PCT Filed: Mar. 26, 2004

(86) PCT No.: PCT/FR2004/000779

§ 371 (c)(1),
(2), (4) Date: Jul. 28, 2006

(87) PCT Pub. No.: WO2004/090401

PCT Pub. Date: Oct. 21, 2004

(65) Prior Publication Data

US 2006/0261300 A1    Nov. 23, 2006

(30) Foreign Application Priority Data

Mar. 27, 2003  (FR)  .................................. 03 03784

(51) Int. Cl.
*F16K 31/08* (2006.01)
(52) U.S. Cl. ........................................ 222/504; 251/65
(58) Field of Classification Search ................. 222/504, 222/47, 49; 251/65; 116/204
See application file for complete search history.

(56) References Cited

U.S. PATENT DOCUMENTS

| 2,572,692 | A | * | 10/1951 | Bottum | 251/231 |
| 3,348,543 | A | * | 10/1967 | Stafford | 251/65 |
| 4,520,961 | A | * | 6/1985 | Hueber | 239/284.1 |
| 4,635,901 | A | * | 1/1987 | Pond | 251/355 |
| 4,881,088 | A | * | 11/1989 | Fisher et al. | 222/51 |
| 4,940,207 | A | * | 7/1990 | Katsuyama | 251/65 |
| 5,484,133 | A | * | 1/1996 | Oliver | 251/65 |
| 5,942,962 | A | * | 8/1999 | Gery | 335/297 |
| 6,092,545 | A | | 7/2000 | Bedore et al. | |
| 6,161,722 | A | | 12/2000 | Niknezhad et al. | |
| 7,004,446 | B2 | * | 2/2006 | Petro et al. | 251/65 |

FOREIGN PATENT DOCUMENTS

EP    0 997 676 A2    5/2000

* cited by examiner

*Primary Examiner*—Kevin P Shaver
*Assistant Examiner*—Jonathan Wood
(74) *Attorney, Agent, or Firm*—Browdy and Neimark, PLLC (57) ABSTRACT

The invention relates to a valve (1), comprising a body (2), within which a needle (3) moves, which can rest with sealing against a seat (23), fixed to the body (2). The needle (3) is magnetically coupled to an actuator body (5), across a closed and a magnetic chamber (4) provided with several magnets (52) between which magnetic bodies (53) are interspersed. The needle (3) has no magnets and is provided with ribs (36) made from a magnetic material. According to the invention, an improved magnetic coupling may be achieved, whereby the thickness and the relative separation of the ribs (36) are largely equal to the thickness (e53) and the relative separation (l52) of the magnetic bodies (53).

15 Claims, 8 Drawing Sheets

MAGNETICALLY-COUPLED VALVE

FIELD OF THE INVENTION

The invention relates to a magnetic valve and to an installation for projecting coating product, which comprises, inter alia, such a valve.

BACKGROUND OF THE INVENTION

It is known, for example, from EP-A-0-997-676 or from U.S. Pat. No. 4,940,207, to produce a valve whose needle is actuated by magnetic coupling through a sealed partition, which enables the product passing through the valve to be separated physically from the control means without using a seal susceptible to degradation, in particular owing to wear by abrasion and/or corrosion. In known valves, the needle is equipped with permanent magnets which are to cooperate with permanent magnets carried by an actuating device in order together to constitute magnetic coupling means. The mounting of permanent magnets on the needle is a tricky operation which requires particular care of a kind which substantially increases the cost price of such a valve. The manufacturing and fitting tolerances of permanent magnets are such that the air gap between the needle and the associated actuating device must be relatively large in order to avoid frictional forces incompatible with the correct operation of the valve. This large air gap reduces the efficiency of the magnetic coupling sought. In addition, the magnets mounted on the needle are susceptible to attack by the fluid passing through the valve, and hence there is a risk of deterioration by abrasion and/or corrosion which may result in a decrease in the performance of such a valve.

It is those disadvantages which the invention more particularly aims to remedy by proposing a magnetic valve which is more economical and more reliable than the known valves, while its operation is entirely dependable.

SUMMARY OF THE INVENTION

To that end, the invention relates to a valve comprising a body inside which a needle capable of resting in a sealed manner against a seat fixedly joined to that body is mobile, the needle being coupled magnetically, through a sealed and non-magnetic partition, to an actuating device equipped with several magnets between which magnetic bodies are interposed, characterized in that the needle does not have magnets.

Owing to the invention, the material of the needle constitutes the induced poles of a magnetic coupling device whose magnetic bodies form the inducing poles. The manufacturing tolerances of the needle enable a narrower air gap to be used than when magnets are mounted on the needle. Advantageously, the needle is equipped with ribs formed from a magnetic material. The positioning and the geometry of those ribs are preferably adapted as a function of the positioning and the geometry of the polar masses constituted by the magnetic bodies. In particular, the thickness of the ribs may be substantially equal to the thickness of the magnetic bodies. Likewise, the relative spacing of the ribs may be substantially equal or correspond substantially to a multiple or a sub-multiple of the relative spacing of the magnetic bodies. The distribution and the geometry of the ribs of the needle permit a concentration of the magnetic flux at their location, and hence improved magnetic coupling between the needle and the actuating device.

According to advantageous aspects, a magnetic valve may comprise one or more of the following features taken in any technically possible combination:

- the needle is covered with a layer of anti-corrosion material;
- the ribs are unitary with the body of the needle, which is particularly economical and enables them to be manufactured by machining, with a high degree of precision;
- the volume between two adjacent ribs is packed with a non-magnetic filling material, which prevents the accumulation of product passing through the valve, for example a coating product, between two ribs;
- the movements of the actuating device can be controlled pneumatically or mechanically;
- the sealed partition is cylindrical, the needle being located inside it, while the actuating device is arranged around the partition. By way of variation, the partition may be flat overall while the ribs of the needle and the magnetic bodies or polar mass of the actuating device are provided with means for guiding the needle in translation. Those guide means may include magnetic field concentration regions which are formed opposite one another on the needle and on the actuating device, respectively, by the creation of cavities in the opposing surfaces of those ribs and those bodies;
- an element coupled magnetically to the actuating device is located outside the body of the valve and is mobile between two positions in which it indicates the open state and the closed state, respectively, of the valve. In that case, the body may be provided with two marks corresponding to the closed state and to the open state, respectively, of the valve, while the above-mentioned element is capable of masking selectively one of those marks while leaving the other mark visible, or vice versa, as a function of its position as controlled by the movements of the actuating device. It may also be provided that a sensor located outside or inside the valve is capable of detecting the movements of that element and of supplying to a monitoring system a signal representative of the open or closed state of the valve.

The invention relates also to an installation for projecting coating product, comprising at least one projector and at least one source of coating product, characterized in that it comprises at least one valve such as described above which is located in the line for supplying coating product or cleaning product to the discharge opening of the above-mentioned projector.

Such an installation permits efficient and reliable control over time of the amounts of coating product(s) and/or cleaning product(s) supplied to a projector. In such an installation, a valve according to the invention may also be used as a pressure regulator.

According to one advantageous aspect of the invention, the above-mentioned valve may be integrated in the projector with which it is associated, which can be linked with its particularly compact character.

BRIEF DESCRIPTION OF THE DRAWINGS

The invention will be better understood and other advantages thereof will emerge more clearly in the light of the following description of seven embodiments of a magnetic valve according to the principle thereof and of coating product projecting installations comprising such valves, the description being given purely by way of example and with reference to the appended drawings in which.

DETAILED DESCRIPTION OF THE PREFERRED EMBODIMENTS

The valve 1 shown in FIGS. 1 to 5 comprises a two-part body 2 formed by a base 21 and a cover 22 which are screwed one to the other. The base 21 defines the seat 23 of the valve 1, against which seat rests a head 31 supported by the main body 32 of a mobile needle 3. In practice, the head 31 is screwed to the end of an axial rod 33 which is unitary with the body 32.

Figures 1, 2:
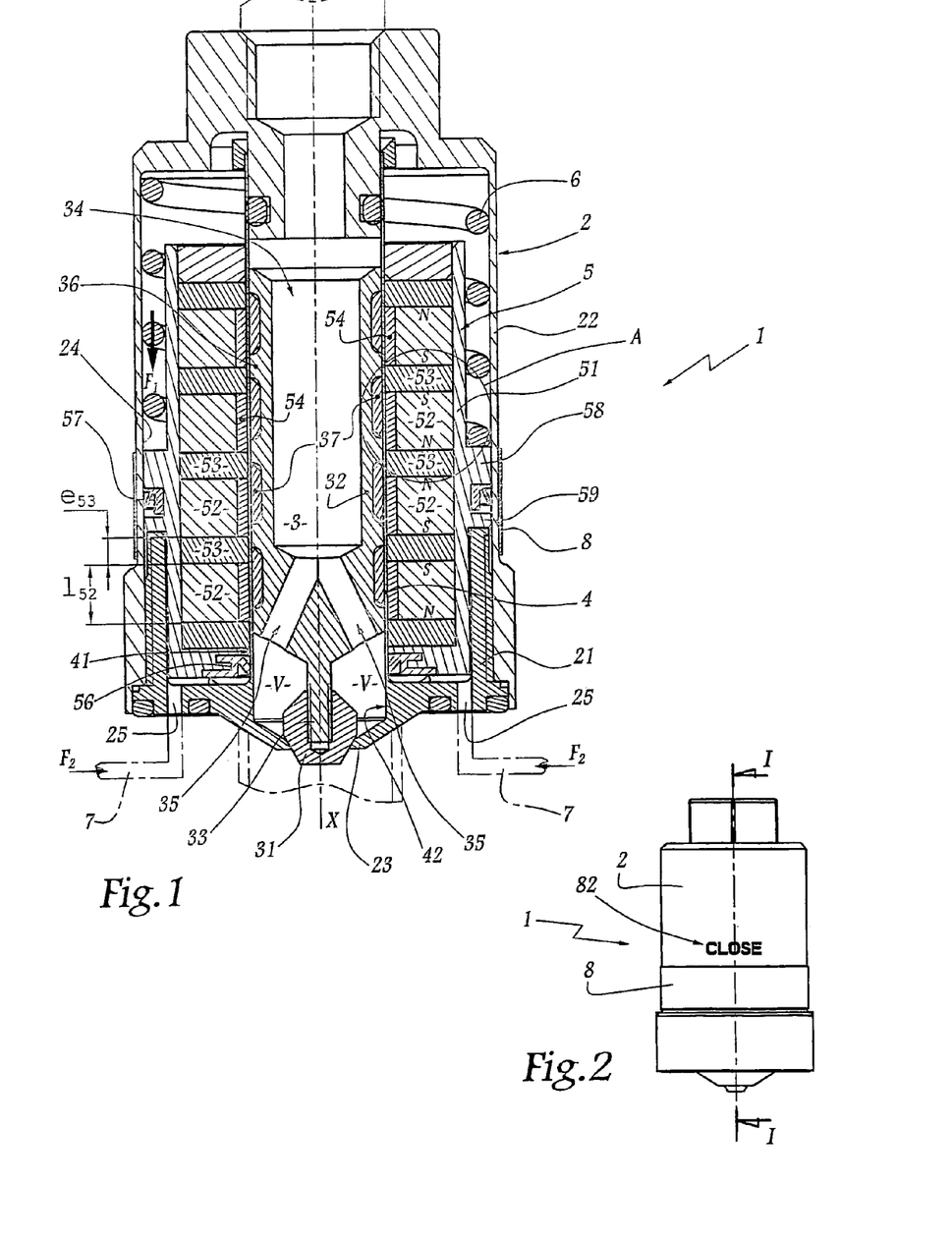
FIG. 1 is a schematic longitudinal section through a valve in the closed configuration, according to a first embodiment of the invention.
FIG. 2 is an outside view on a smaller scale of the valve of FIG. 1 on which the sectional plane of FIG. 1 is marked by the line I-I.

The body 32 is provided with a central drilled bore 34 from which diverge four ducts 35 which connect the drilled bore 34 to a volume V located around the rod 33 and the head 31 inside the cylindrical volume which has a circular base and which is defined by a sealed and non-magnetic partition 4.

The cross-section of the needle 3 is such that it can slide in the volume defined by the partition 4, being guided in translation. The central axis which is common to the elements 3 and 4 and which corresponds to the sliding direction of the needle 3 is marked X-X'.

An actuating device 5 is located inside the body 2 and around the partition 4. This device 5 comprises a body 51 in which are mounted several permanent magnets 52, between which magnetic bodies 53 constituting the polar masses of the magnets 52 are located. The magnets 52 are annular and are arranged around the partition 4 which they therefore surround, their respective polarities being reversed in pairs as can be seen from the marking of their South and North poles on the right in FIG. 1. The bodies 53 are also annular. In practice, they may be steel washers.

Polar masses 53 are also provided on each side of the stack of magnets carried by the device 5.

Protective packings 54 are located between the magnets 52 and the partition 4 in order to protect the magnets against the risk of wear by abrasion.

The width of a magnet 52 taken parallel with the axis X-X' is marked $l_{52}$. The thickness of a body 53 measured parallel with the axis X-X' is marked $e_{53}$.

The device 5 is also provided with a lip seal 56 configured to rest against the external surface 41 of the partition 4. A second lip seal 57 is also mounted on the body 51 of the device 5 and rests against the internal surface 24 of the cover 22.

In addition, the body 51 is provided with an external radial collar 58 on which rests a spring 6 which exerts on the collar 58 a resilient force $F_1$ directed towards the base 21.

This base is provided with two openings 25 which may each be connected to a duct 7 for the admission of control air, as shown by the arrows $F_2$. The air penetrating into the body 2 through the openings 25 enables the device 5 to be pushed back against the force $F_1$. In other words, the position of the device 5 along the axis X-X' can be controlled pneumatically by the supply of air from the duct 7.

This controlled displacement of the device 5 is used to control the displacement of the needle 3 and, more particularly, of its head 31 relative to the seat 23 of the body 2.

In order to do this, the body 32 of the needle 3 is provided with ribs 36 which are unitary with the body 32 and which are advantageously produced by machining its external radial surface. The ribs 36 are separated from one another by a distance d which is substantially equal to the width $l_{52}$ of the magnets 52. Furthermore, each rib 36 has a thickness $e_{36}$, taken parallel with the axis X-X', which is substantially equal to the thickness $e_{53}$ of the bodies 53.

Figure 1A:
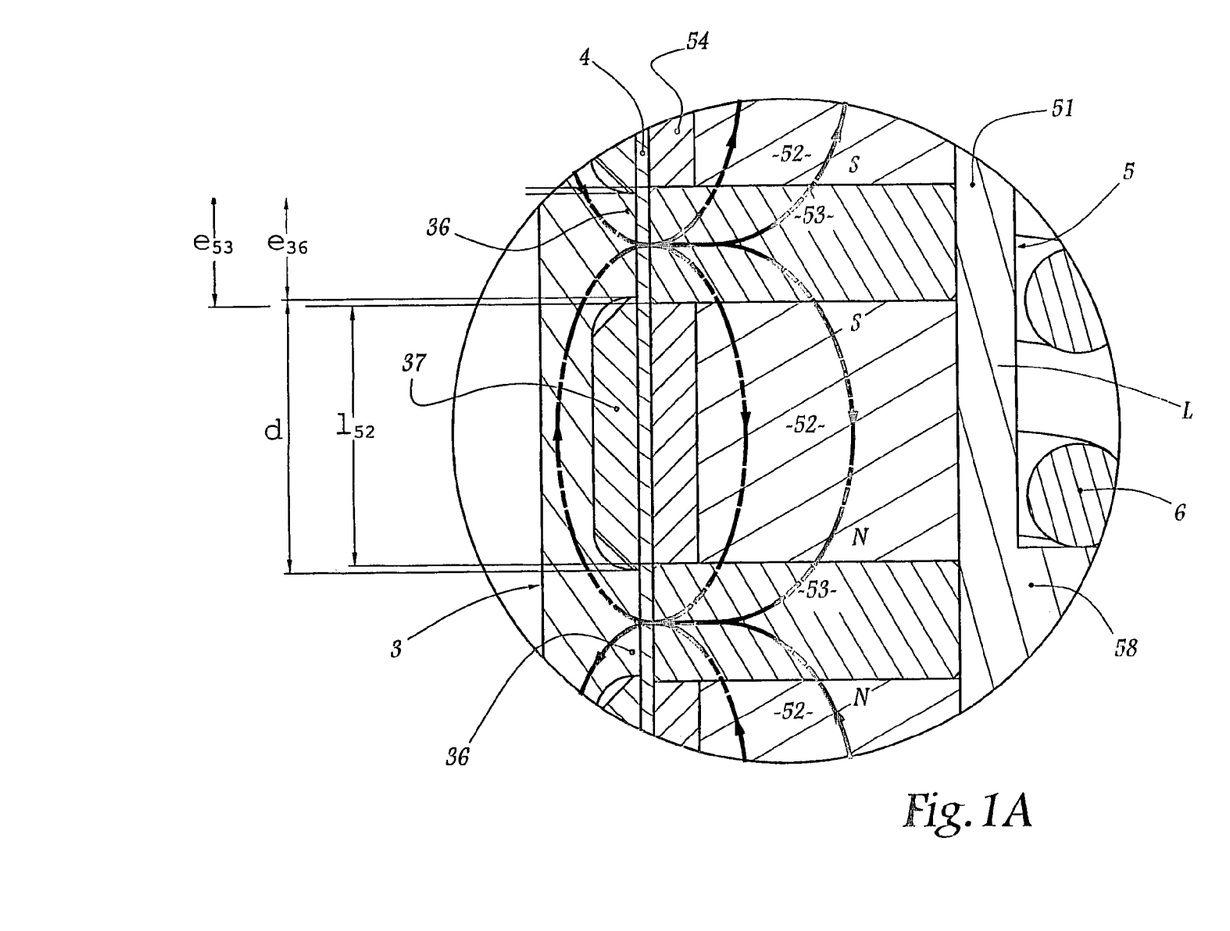
FIG. 1A is a view on a larger scale of the detail A in FIG. 1 when the needle of the valve is in the course of displacement between its closed and open positions.
Figure 3:
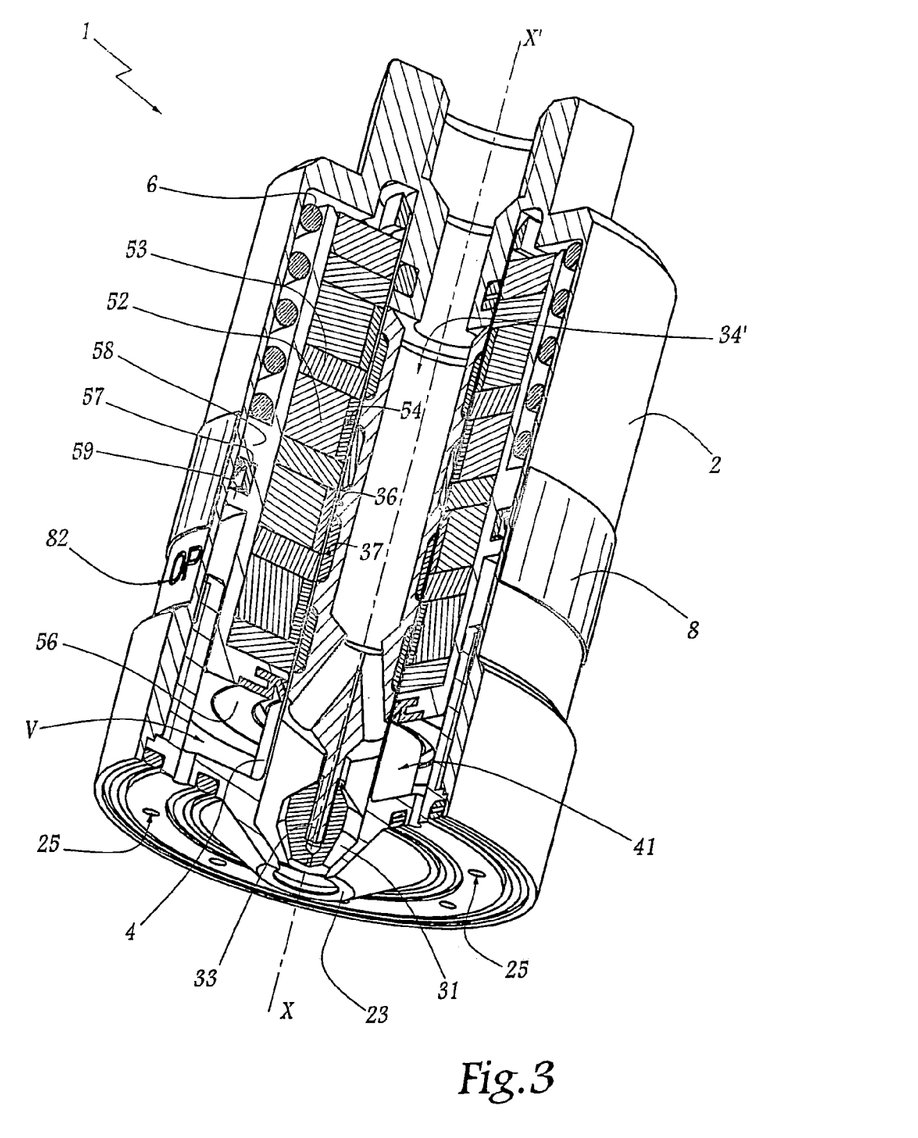
FIG. 3 is a partially cut-away perspective view of the valve of FIGS. 1, 1A and 2.

Thus, and as shown partially in FIG. 1A, the ribs 36 can be simultaneously aligned with the bodies 53 of the device 5. They constitute the induced poles of the polar masses 53.

As shown in FIG. 1A which corresponds to the configuration when the needle 3 follows a displacement imposed by the device 5 and when the alignment of the elements 36 and 53 is not prevented by the head 31 resting on the seat 23, the magnetic field lines L created by the magnets 52 pass through the elements 53 and 36, which corresponds to a position of equilibrium of the magnetic forces.

Figures 4, 5:
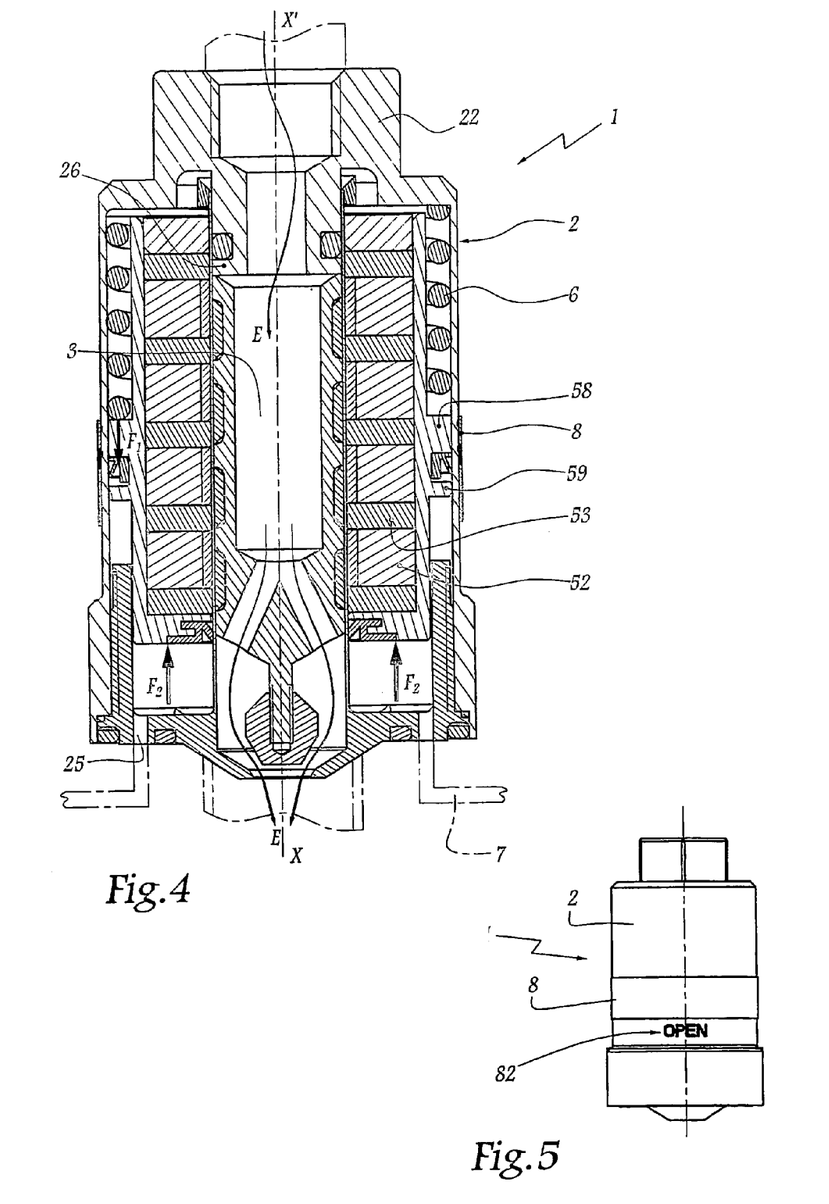
FIG. 4 is a section analogous to FIG. 1 when the valve is in the open configuration.
FIG. 5 is an outside view similar to FIG. 2, the valve being in the configuration of FIG. 4.

When the device 5 is moved away from the base 21 under the effect of a supply of air to the body 2 through the openings 25, the bodies 53 move upwards in FIG. 1, so that the magnetic force generated on the ribs 36 displaces the body 32 in the same direction to reach the position represented in FIG. 4 where the needle 3 rests against a portion 26 of the cover 22 which penetrates into the interior volume defined by the partition 4. Thus, in that position, the needle is stable because it abuts the portion 26, unlike the needle of the valve known from EP-A-0 997 676.

In the configuration of FIG. 4, the bodies 53 and the ribs 36 are not aligned because the device 5 has travelled further relative to the displacement of the needle 3.

Likewise, in the configuration of FIG. 1, the travel of the needle 3 is limited by the head 31 resting against the seat 23, while the travel of the device 5 can continue under the effect of the resilient force $F_1$, in which case the elements 53 and 36 are not aligned.

Packing rings 37 are arranged around the body 32 in the grooves separating two adjacent ribs 36, these rings being produced from a non-magnetic material which may be selected as a function of its coefficient of friction on the internal surface 42 of the partition 4.

Since the ribs 36 are formed by machining, their geometry may be defined with a very high degree of precision, so that the manufacturing tolerances of the needle 3 may be low, which means that it is possible for there to be a narrow air gap between the elements 53 and 36 and hence efficient magnetic coupling between the device 5 and the needle 3.

In order to avoid the risk of the ribs 36 being oxidized, the needle 3 is coated, at least at its ribs, with a layer of anti-corrosion material, such as electrolytically deposited chromium.

Since the needle 3 does not have a magnet, the magnets of the valve 1 are not at risk of being soiled by the product passing through the valve, even if this product were to spread into the gap between the external radial surface of the needle 3 and the surface 42. The magnets 52 are protected from the products passing through the valve 1 owing to the partition 4.

It will be appreciated that it is not necessary to provide a spring in a region susceptible to attack by the product passing through the valve, such a product possibly being corrosive or chemically aggressive.

A control ring 8 produced from a magnetic material is mounted outside the cover 22, being able to slide around the cover parallel with the axis X-X'. Magnetic coupling is obtained, through the cover 22 which is non-magnetic, between the device 5 and the ring 8. The geometry of the collar 58 associated with a second collar 59 may be selected to promote this coupling. Thus, the ring 8 can slide around the body 2 as a function of the position of the device 5. Two inscriptions 81 and 82 are provided respectively on the outside of the cover 22 and are provided in order to be selectively masked by the ring 8. To be more precise, the ring 8 masks the inscription 82 which signifies "open" when the valve is closed, as shown in FIG. 2. The inscription 81 which signifies "closed" is then visible. A person looking at the valve 1 can thus read the inscription 81 and know that this valve is closed.

Conversely, in the configuration of FIGS. 4 and 5, the ring 8 masks the inscription 81 and leaves the inscription 82 visible, in which case a person looking at the valve 1 knows that it is in an open configuration.

According to a variant of the invention which is not shown, the movements of the ring 8 can be detected by a sensor of any known type, the sensor enabling a signal which is a function of the open or closed state of the valve to be delivered to a monitor. The sensor may be, for example, inductive, electrical, optical or pneumatic.

The partition 4 may have a base other than a circular base, in which case the geometry of the moving parts is adapted.

In the configuration of FIGS. 4 and 5, the arrows E represent the flow of a product such as a coating product through the valve 1.

Figure 6:
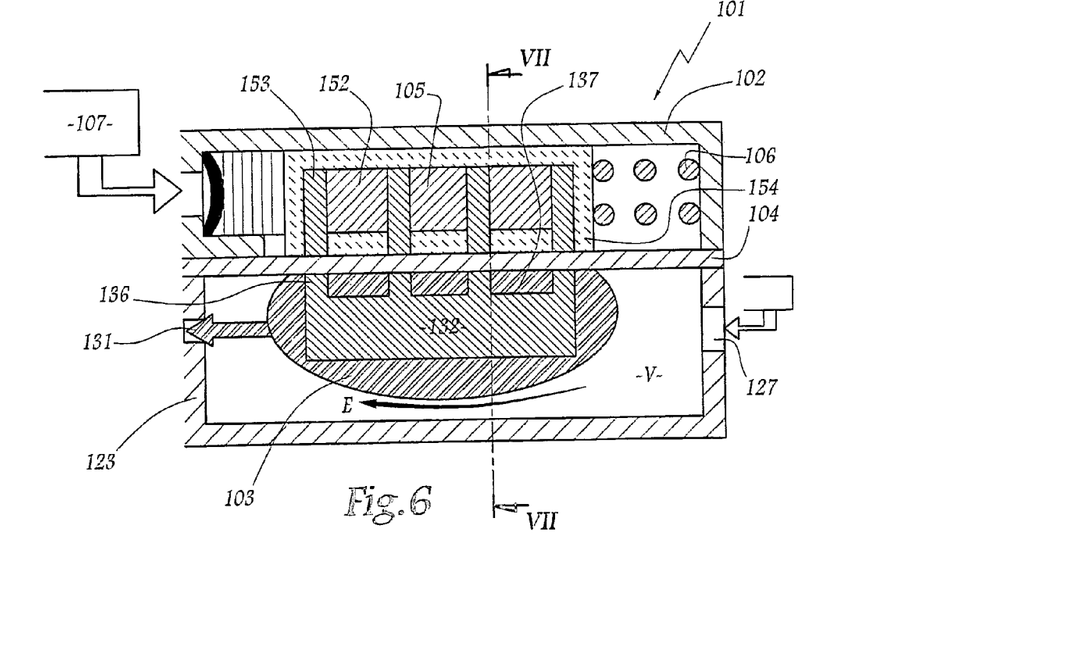
FIG. 6 is a schematic longitudinal section through a valve according to a second embodiment of the invention.
Figure 7:
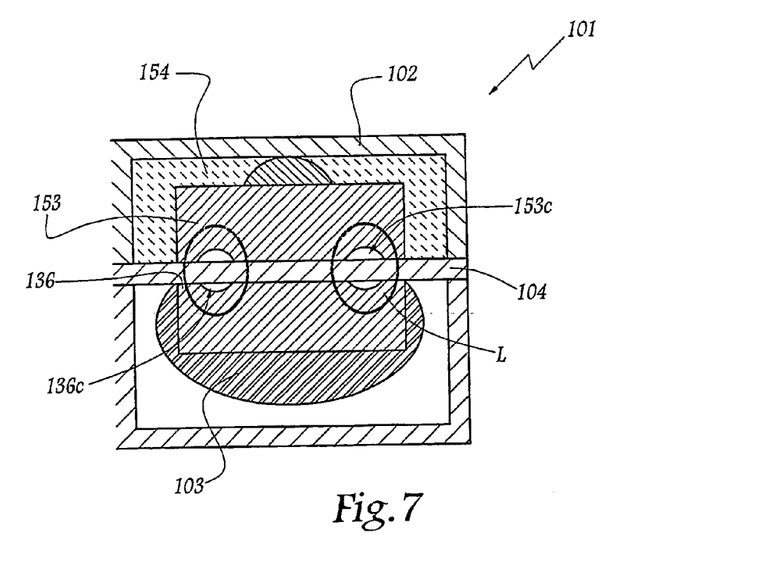
FIG. 7 is a section taken on the line VII-VII in FIG. 6.

In the second embodiment of the invention shown in FIGS. 6 and 7, the elements analogous to those of the first embodiment bear identical references increased by 100. The valve 101 of this embodiment comprises a body 102 whose internal volume is separated into two portions by a sealed partition 104 which is flat overall and non-magnetic. A needle 103 is located in the body 102, on one side of the partition 104, inside a volume V connected by an opening 127 to a coating product supply. The needle 103 carries a head 131 which is to rest selectively against a seat 123 formed by the body 102.

An actuating device 105 is provided in the body 102, on the other side of the partition 104 relative to the needle 103, and is subjected to the action of a spring 106 and a source of control air 107. The arrow E in FIG. 6 represents the flow path of a coating product when the valve is open.

As above, the device 105 carries magnets 152 between which magnetic bodies 153 are located. The main body 132 of the needle 103 is for its part provided with ribs 136 which are unitary with the body and have a thickness and spacing substantially equal to the thickness and spacing of the magnetic bodies 153.

Packing strips 137 are provided between the ribs 136, and likewise packing strips 154 are provided between the bodies 53, the strips 154 covering magnets 152.

As emerges more especially from FIG. 7, cavities 136*c* are provided in the ribs 136, while cavities 153*c* of a corresponding shape are provided in the bodies 153. These cavities enable the magnetic field lines L to be concentrated around them, which enables the needle 103 to be brought back into alignment relative to the device 105. In other words, the edge effects of the magnetic field are used to guide the needle 103 in translation.

By way of variation, the guiding of the needle 103 in translation can be obtained by relief portions, in particular grooves or ribs provided longitudinally on the partition 104 and/or on the internal surface of the body 102.

Figure 8:
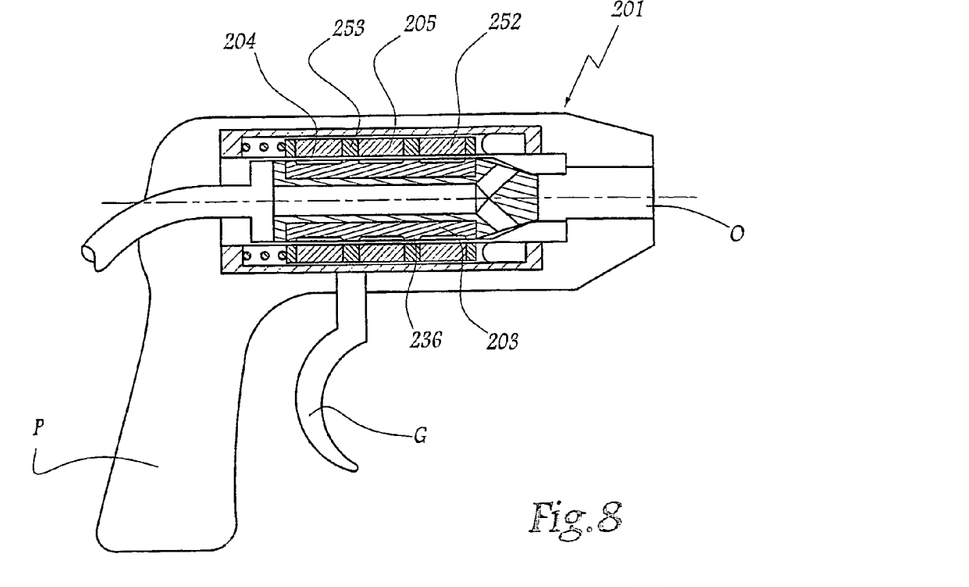
FIG. 8 is a schematic diagrammatic representation of a manual gun which projects coating product and which is equipped with a valve according to the invention.

As can be seen from FIG. 8, a valve 201 according to the invention can be integrated in a gun P for projecting coating product. In that case, it is a valve whose needle 203 is substantially circular and located inside a volume defined by a sealed and non-magnetic partition 204 around which an actuating device 205 is arranged.

Figure 9:
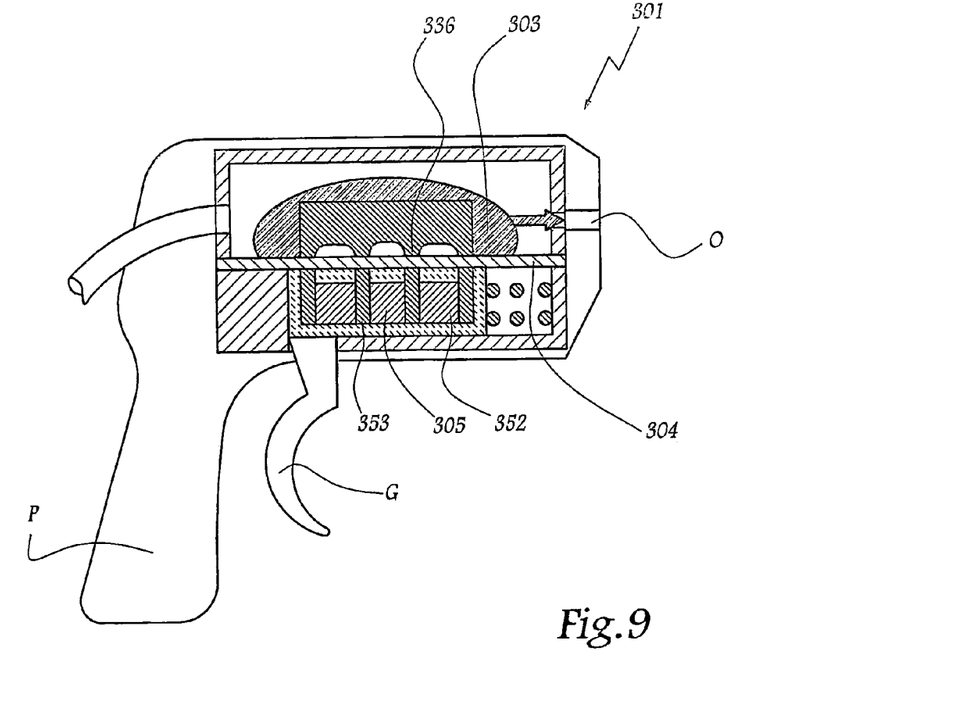
FIG. 9 is a view similar to FIG. 8 for a gun equipped with a valve according to another embodiment of the invention.

As shown in FIG. 9, a gun P may also comprise a valve 301 of the same type as that described with reference to FIGS. 6 and 7, with a sealed, non-magnetic and flat partition 304.

In the two cases of FIGS. 8 and 9, the trigger G of the gun P is connected mechanically to the actuating device 205 or 305 of the valve 201 or 301, which enables the associated movements of the needle 203 or 303, and the supply to the discharge openings O of the guns P to be controlled. As above, the needles 203 and 303 do not have magnets and are provided with ribs 236 and 336 whose geometry and position enable them to constitute the induced poles of a set of magnets 252 and 352 and of polar masses 253 and 353.

Figure 10:
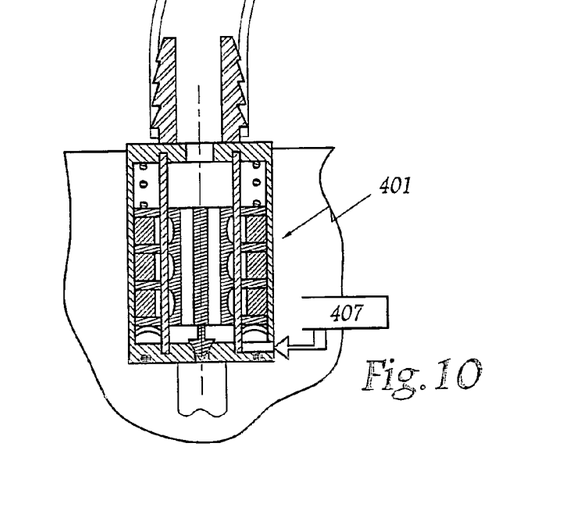
FIG. 10 is a schematic diagrammatic section through a valve according to the invention used as a connection having a controlled needle.

As shown in FIG. 10, a valve 401 according to the invention can be used as a connection having a needle controlled by an external source 407.

Figure 11:
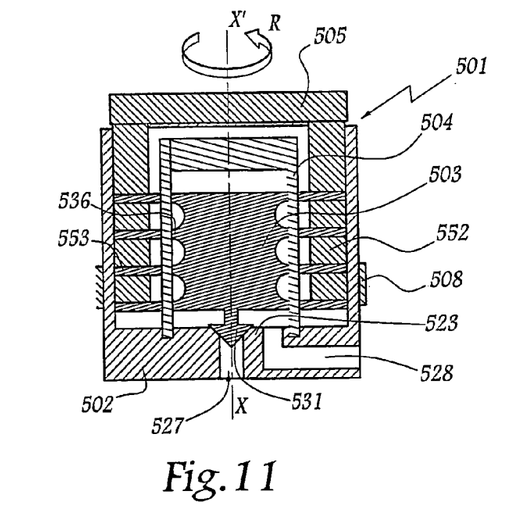
FIG. 11 is a schematic diagrammatic section through a valve according to the invention used as a tap.

FIG. 11 shows a valve 501 according to the invention which is to be supplied by way of an opening 527 which is formed in its casing 502 and the outlet of which forms a seat 523 acting as a rest for a head 531 carried by a needle 503 provided with ribs 536 which are to participate in the magnetic coupling of the needle 503, through a sealed and non-magnetic partition 504, to an actuating device 505 provided with magnets 552 between which magnetic bodies 553 forming polar masses for the magnets 552 are located.

The position of the device 505 is controlled by screwing in or unscrewing the device 505 inside the casing 502, which is shown by the arrow R. This screwing-in or unscrewing movement enables the device 505 to be displaced parallel with a central axis X-X' of the valve 501 and the needle 503 and its head 531 to be displaced in corresponding translation. It is thus possible to free the passage for the flow of coating product between the opening 527 and a discharge opening 528 of the valve.

The valve 501 may here be regarded as a tap.

A ring 508 of the same-type as the ring 8 of the first embodiment can be mounted outside the casing 502 and coupled magnetically to the device 505 in order to indicate the position of the device 505 and the needle 503. The ring 508 is mobile between two end positions and can take up various intermediate positions as a function of the degree of opening of the valve 501. A graduation may be provided on the casing 502 in order to facilitate the noting of the position of the ring 508.

Figure 12:
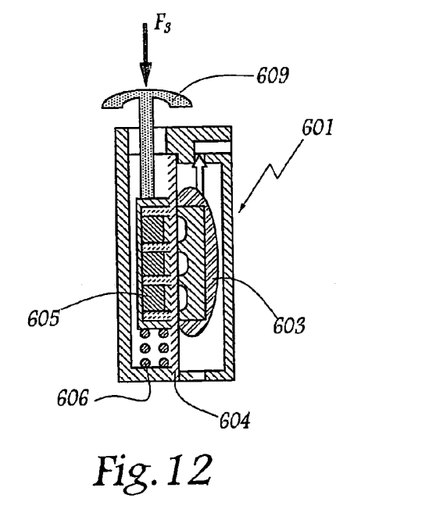
FIG. 12 is a section similar to FIG. 11 for another valve also used as a tap.

The valve 601 represented in FIG. 12 may also be regarded as a tap, of which the needle 603, the sealed partition 604 and the actuating device 605 are similar to those shown in FIGS. 6 and 7. In this embodiment, the device 605 is fixedly joined to a push-button 609 on which a user can exert a force $F_3$ which permits the displacement of the push-button 605 and the needle 603 against a return force generated by a spring 606. The valve 605 is a tap which can be operated simply by pressing.

Figure 13:
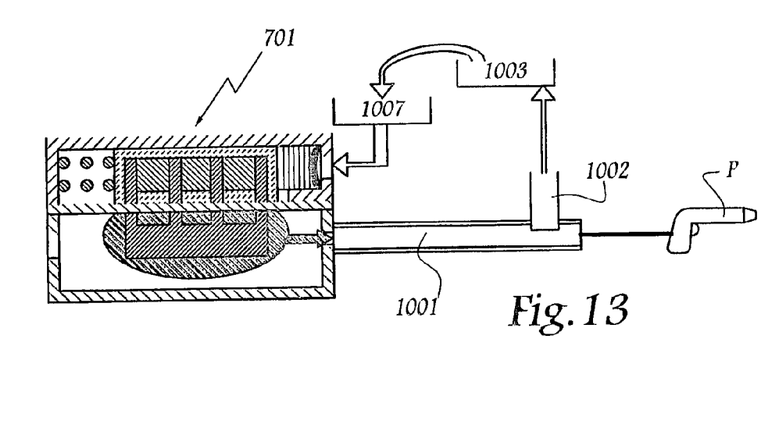
FIG. 13 is a schematic diagrammatic representation of an installation for projecting coating product incorporating a valve according to the invention and FIG. 14 is a view similar to FIG. 13 for another installation according to the invention.

As shown in FIG. 13, a valve 701 according to the second embodiment described above may be integrated in a line 1001 for the supply of coating product to a coating product projector P which may be of any known type, electrostatic or non-electrostatic, manual or automatic. A flow or pressure sensor 1002 is connected to a regulating unit 1003 which controls a source 1007 for the supply of compressed air to the valve 701.

Figure 14:
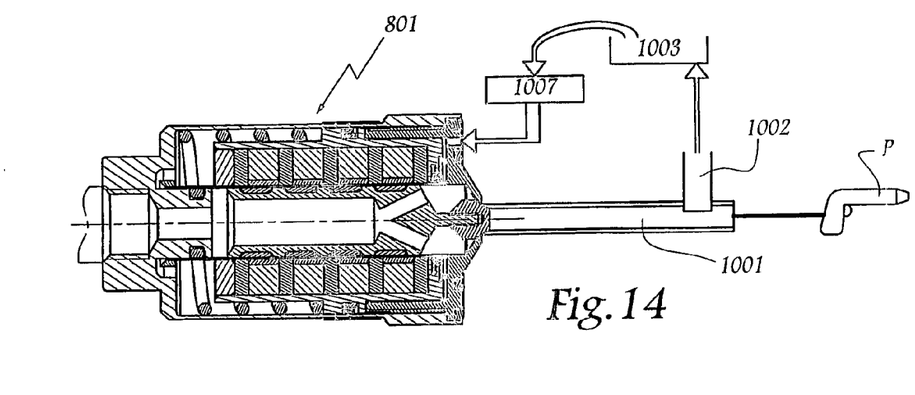

As shown in FIG. 14, a valve 801 according to the first embodiment may also be used in an installation comprising a line 1001, a sensor 1002, a regulating unit 1003 and a source 1007 of pressurized air.

The invention has been represented with magnetic valves of the two-way type. It is, however, applicable to three-way valves by making modifications that are within the competence of the person skilled in the art.

The invention is independent of the exact number of magnets carried by the actuating device. In fact, that number is chosen as a function of the intensity of the coupling force sought.

In addition, according to a variant of the invention which is not shown, the relative spacing d of the ribs 36 and the like may be selected to be equal to a sub-multiple of the width $l_{52}$ of the magnets 52. In that case, alignment of some ribs 36 or the like with the other bodies 53 and the like remains possible, some other ribs 36 then being opposite the magnets 52. These other ribs 36 are then not functional for the magnetic coupling sought. This applies to all of the embodiments envisaged.

According to another variant of the invention which is not shown, the spacing d may be equal to a multiple of the width $l_{52}$, that is to say, of the spacing between the bodies 53. In that case, some bodies 53 are opposite a ring 37. This may be applied to all of the embodiments envisaged.

The technical features of the various embodiments described above may be combined with one another within the scope of the present invention.

The invention claimed is:

1. Valve comprising: a body; a seat fixedly joined to the body; and a needle capable of resting in a sealed manner against said seat, said needle being disposed inside said body and being movaile relative to said body, the needle being coupled magnetically, through a sealed and non-magnetic partition, to an actuating device equipped with several magnets between which magnetic bodies are interposed, wherein said needle does not have magnets and is equipped with ribs formed from a magnetic material, wherein said needle is of unitary, one-piece construction, and has an external radial surface provided with qrooves between, and delimiting, said ribs, and wherein said needle further comprises non-magnetic filling material in said grooves.

2. Valve according to claim 1, wherein the thickness of the ribs is substantially equal to the thickness of the magnetic bodies.

3. Valve according to claim 1, wherein the relative spacing of the ribs is substantially equal to, or corresponds substantially to, a multiple or a sub-multiple of the relative spacing of the magnetic bodies.

4. Valve according to claim 1, wherein the needle is covered with a layer of anti-corrosion material.

5. Valve according to claim 1, wherein of the actuating device are controlled pneumatically.

6. Valve according to claim 1, wherein the actuating device is controlled mechanically.

7. Valve according to claim 1, wherein the sealed partition is cylindrical, the needle being located inside the partition while the actuating device is arranged around the partition.

8. Valve according to claim 1, wherein the non-magnetic partition is flat overall and the ribs and the magnetic bodies are provided with means for guiding the needle in translation.

9. Valve according to claim 8, wherein the means for guiding the needle includes magnetic field concentration regions formed opposite one another, on the needle and on the actuating device, respectively, by the creation of cavities in opposing surfaces of the ribs and the magnetic bodies.

10. Valve according to claim 1, further comprising an element coupled magnetically to the actuating device and located outside the body, the element being mobile in translation between two positions in which it indicates an open state and a closed state, respectively, of the valve.

11. Valve according to claim 10, further comprising a sensor adapted to detect the movements of the element and to supply to a monitoring system a signal representative of the open or closed state of the valve.

12. Valve according to claim 10, wherein the body is provided with two marks corresponding to the closed state and the open state, respectively, of the valve, wherein the element is capable of masking selectively one of the marks while leaving the other mark visible, or vice versa, as a function of its position controlled by the movements of the actuating device.

13. Valve according to claim 12, further comprising a sensor adapted to detect the movements of the element and to supply to a monitoring system a signal representative of the open or closed state of the valve.

14. Installation for projecting coating product, comprising at least one projector and at least one source of coating product, wherein said installation comprises at least one valve according to claim 1, located in a line for supplying coating product or cleaning product to a discharge opening of the projector.

15. Installation according to claim 14, wherein the valve is integrated in the projector.

* * * * *